(12) United States Patent
Duan et al.

(10) Patent No.: US 11,954,123 B2
(45) Date of Patent: Apr. 9, 2024

(54) DATA PROCESSING METHOD AND DEVICE FOR DATA INTEGRATION, COMPUTING DEVICE AND MEDIUM

(71) Applicants: Beijing Zhongxiangying Technology Co., Ltd., Beijing (CN); BOE TECHNOLOGY GROUP CO., LTD., Beijing (CN)

(72) Inventors: Jifang Duan, Beijing (CN); Jianzhou Wang, Beijing (CN); Shaoqing Wu, Beijing (CN); Decai He, Beijing (CN); Jianmin Wu, Beijing (CN)

(73) Assignees: Beijing Zhongxiangying Technology Co., Ltd., Beijing (CN); BOE TECHNOLOGY GROUP CO., LTD., Beijing (CN)

( * ) Notice: Subject to any disclaimer, the term of this patent is extended or adjusted under 35 U.S.C. 154(b) by 84 days.

(21) Appl. No.: 17/410,810

(22) Filed: Aug. 24, 2021

(65) Prior Publication Data
US 2022/0129483 A1    Apr. 28, 2022

(30) Foreign Application Priority Data
Oct. 28, 2020   (CN) .......................... 202011171993.0

(51) Int. Cl.
*G06F 16/00* (2019.01)
*G06F 16/27* (2019.01)
*G06Q 10/067* (2023.01)

(52) U.S. Cl.
CPC ......... *G06F 16/275* (2019.01); *G06Q 10/067* (2013.01)

(58) Field of Classification Search
None
See application file for complete search history.

(56) References Cited

U.S. PATENT DOCUMENTS

| | | | | |
|---|---|---|---|---|
| 8,543,539 | B2* | 9/2013 | Ahluwalia | G06F 16/2282 707/613 |
| 9,569,070 | B1* | 2/2017 | Ma | G06F 16/273 |
| 10,963,483 | B2* | 3/2021 | Radebaugh | G06F 16/178 |
| 2007/0073787 | A1* | 3/2007 | Tysowski | G06F 16/275 |
| 2016/0105502 | A1* | 4/2016 | Shen | H04L 45/44 709/205 |
| 2017/0364572 | A1* | 12/2017 | Allinson | G06F 16/178 |
| 2019/0102418 | A1* | 4/2019 | Vasudevan | G06F 16/2365 |
| 2021/0208982 | A1* | 7/2021 | Yang | G06F 11/1464 |

* cited by examiner

*Primary Examiner* — Debbie M Le
(74) *Attorney, Agent, or Firm* — Myers Bigel, P.A.

(57) ABSTRACT

A data processing method is disclosed, the method comprising: after data synchronization, obtaining data offset of synchronous data related to a data integration task to be performed, the data offset representing deviation of the synchronous data from corresponding source data; determining whether the synchronous data is complete based on the data offset; in response to the synchronous data being complete, performing the data integration task to the synchronous data.

17 Claims, 5 Drawing Sheets

| SourceTableName | TableName | PstartTime | PEndTime | OffSet | TimeStamp |
|---|---|---|---|---|---|
| business 1.S11 | ods.S11 | 2019-10-01 06:00 | 2019-10-01 07:00 | 0 | 2019-10-01 07:02:00 |
| business 1.S11 | ods.S11 | 2019-10-01 07:00 | 2019-10-01 08:00 | -10 | 2019-10-01 08:02:00 |
| business 2.S21 | ods.S21 | 2019-10-01 06:00 | 2019-10-01 07:00 | 0 | 2019-10-01 07:02:00 |
| business 2.S21 | ods.S21 | 2019-10-01 07:00 | 2019-10-01 08:00 | 0 | 2019-10-01 08:02:00 |
| business 2.S22 | ods.S22 | 2019-10-01 06:00 | 2019-10-01 07:00 | 0 | 2019-10-01 07:02:00 |
| business 2.S22 | ods.S22 | 2019-10-01 07:00 | 2019-10-01 08:00 | 0 | 2019-10-01 08:02:00 |
| business n.Sn1 | ods.Sn1 | - | - | 0 | 2019-10-01 08:01:00 |

Fig. 4a

| JobName | OdsTableName | Type |
|---|---|---|
| Job1 | S11 | incremental |
| Job1 | S21 | incremental |
| Jobi | S11 | incremental |
| Jobi | S22 | incremental |
| Jobi | Sn1 | full |

DATA PROCESSING METHOD AND DEVICE FOR DATA INTEGRATION, COMPUTING DEVICE AND MEDIUM

RELATED APPLICATION

The present application claims the benefit of Chinese Patent Application No. 202011171993.0, filed on Oct. 28, 2020, the entire disclosures of which are incorporated herein by reference.

TECHNICAL FIELD

This disclosure relates to the data processing and analysis field, particularly to a data processing method, a data processing device, a computing device and a computer readable storage medium.

BACKGROUND

With the continuous update and iteration of big data technology, data management and analysis platforms have developed rapidly. These data management and analysis platforms can realize comprehensive data analysis and processing across businesses and systems. In the cross platform data processing of related technologies, data synchronization and data integration are generally bound together. This will increase the performance burden of the original business system and it is inevitable that there will be data synchronization failures caused by synchronization process exceptions or network exceptions.

SUMMARY

In view of the above defects or shortcomings in the related technologies, it is desired to provide a data processing method, a data processing device, a computing device and a computer readable storage medium.

According to an aspect of the present disclosure, a data processing method is provided, comprising: obtaining, after data synchronization, data offset of synchronous data related to a data integration task to be performed, the data offset representing deviation of the synchronous data from corresponding source data; determining whether the synchronous data is complete based on the data offset; in response to the synchronous data being complete, performing the data integration task to the synchronous data.

According to another aspect of the present disclosure, a data processing device is provided, comprising: an obtaining unit, configured to, obtain, after data synchronization, data offset of synchronous data related to a data integration task to be performed, the data offset representing a deviation of the synchronous data from corresponding source data; a determining unit, configured to determine whether the synchronous data is complete based on the data offset; and a performing unit, configured to, in response to the synchronous data being complete, perform the data integration task to the synchronous data.

According to a further aspect of the present disclosure, a computing device is provided, comprising: a processor; and a memory with instructions stored thereon, the instructions, when executed on the processor, causing the processor to carry out the data processing method according to some embodiments of the present disclosure.

According to yet another aspect of the present disclosure, a computer readable storage medium is provided, on which a computer program is stored, the computer program being used for carrying out the data processing method according to some embodiments of the present disclosure.

In the data processing method according to some embodiments of the present disclosure, the additional step of synchronous data integrity verification is added after data synchronization and before data integration, wherein the synchronous data integrity (i.e., the data synchronization process is successfully completely without missing data) is determined by monitoring the data offset (or data deviation) of the synchronous data obtained from the data synchronization process with respect to the corresponding source data in the business system, thereby being capable of performing the subsequent data integration step on the premise of ensuring integrity of the synchronous data, so as to avoid errors in the subsequent data integration caused by data missing in the synchronization process, which ensures timeliness, integrity and accuracy of the data, and improves the quality of data processing and analysis.

BRIEF DESCRIPTION OF THE DRAWINGS

By reading the detailed description on the non-limiting embodiments made with reference to the following drawings, other features, purposes and advantages of the present disclosure will become more obvious.

DETAILED DESCRIPTION OF THE DISCLOSURE

The present disclosure will be further described in detail below in combination with the accompanying drawings and embodiments. It can be appreciated that the specific embodiments described herein are only used for explaining this relevant disclosure rather than limiting the present disclosure. In addition, it should be noted that for the convenience of depicting, only related parts of the present disclosure are shown in the drawings. It should be noted that in the event of not conflicting, the embodiments in the present disclosure and the features in the embodiments can be combined with each other.

It will be appreciated that although the terms such as first, second, third can be used herein for describing various elements, components and/or parts, these elements, components and/or parts should not be limited by these terms. These terms are only used to distinguish one element, component and/or part from another. Therefore, the first element, component or part discussed below can be called the second element, component or part without deviating from the teaching of the present disclosure.

The terms used herein are for the purpose of describing specific embodiments only and are not intended to limit the present invention. As used herein, the singular forms "a", "one" and "the" intend also include plural forms, unless otherwise instructed in the context clearly. It will be further understood that the terms "comprise" and/or "include", when used in this Specification, specify the presence of the described features, entirety, steps, operations, elements and/or components, while not excluding presence of one or more other features, entirety, steps, operations, elements, components and/or groups thereof or adding one or more other features, entirety, steps, operations, elements, components and/or groups thereof. As used herein, the term "and/or" includes any and all combinations of one or more of the associated listed items.

Unless otherwise defined, all terms (including technical terms and scientific terms) used herein have the same meanings as generally understood by the ordinary skilled person in the art to which the present invention belongs. It will be further appreciated that terms such as those defined in commonly used dictionaries should be interpreted as having meanings consistent with their meanings in the relevant field and/or in the context of this Specification, and will not be interpreted in an idealized or overly formal sense unless explicitly defined herein.

Figure 1:
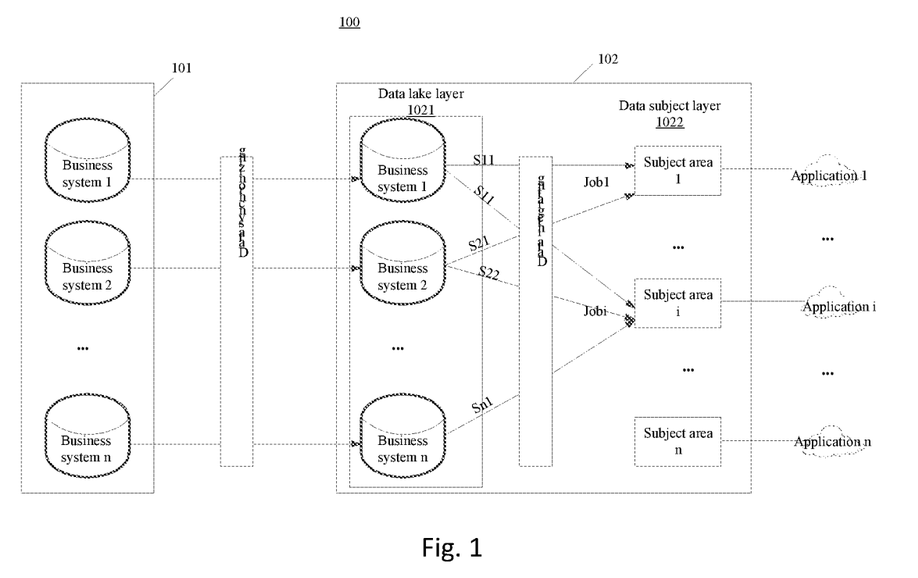
FIG. 1 shows an example application scene of a data processing method according to some embodiments of the present disclosure.

FIG. 1 shows an exemplary application scene of a data processing method according to some embodiments of the present disclosure, i.e., a big data system 100.

In order to provide decision-making suggestions for the operation and development of the enterprise, it is necessary to integrate various business data scattered inside and outside the enterprise so as to obtain integrated data for specific subjects, finally, these integrated data are used for specific applications (e.g., decision analysis). The big data system can realize data processing across databases or platforms to provide business analysis data for enterprises and present the visualized analysis results to the managers. For example, the Data Warehouse and Data Lake Technology can be used to realize data integration involving cross database and cross platform.

As shown in FIG. 1, the big data system 100 can comprise a business platform 101 and a data analysis platform 102. The business platform 101 and the data analysis platform 102 can be either independent physical servers, or a server cluster or distributed system composed of multiple physical servers, or cloud servers that provide basic cloud computing services such as cloud service, cloud database, cloud computing, cloud function, cloud storage, network service, cloud communication, middleware service, domain name service, safety service, CDN, as well as big data and artificial intelligence platform. In some embodiments, the business platform 101 and the data analysis platform 102 can also be configured on a terminal device.

As shown in FIG. 1, the business platform 101 can comprise a plurality of business systems, such as business system 1, business system 2, . . . , business system n. The business platform 101 as shown in FIG. 1 and the business systems thereof can comprise a business database for providing original business data (i.e., source data). The business database can be a relational database (RDB).

As shown in FIG. 1, the data analysis platform 102 comprises a data lake layer 1021 and a data subject layer 1022. As shown in FIG. 1, the data lake layer 1021 is used for storing synchronous data which represents data obtained from the data synchronization process (e.g., copy) with respect to the original business data (i.e., source data) in the business platform 101, i.e., copy of the original business data. As shown in FIG. 1, the data subject layer 1022 is used for storing subject data (i.e., data required by specific subject) obtained by performing data integration processing to the synchronous data (i.e., copy of the source data) in the data lake layer 1021. As shown in FIG. 1, the data subject layer 1022 can comprise a plurality of subject areas, i.e., subject area 1, . . . , subject area i, . . . , subject area n, wherein each subject area corresponds to one or more data integration tasks, and each data integration task corresponds to one or more business data tables in the synchronous data. The data analysis platform 102 can be for example a Hadoop platform.

As shown in FIG. 1, the data analysis and processing process of the big data system 100 generally includes the following steps: first, data synchronization, i.e., the data analysis platform 102 copies the original business data (i.e., source data) in the business database of one or more business systems of the business platform 101 into the data lake layer 1021 of the data analysis platform 102, so as to obtain the synchronous business data or synchronous data (i.e., copy of the source data); second, data integration, i.e., the data analysis platform 102 extracts the synchronous data from the data lake layer 1021 to perform operations such as computing, merging etc., so as to obtain the integrated data and write it into the data subject layer 1022. Finally, the integrated data in the subject layer is used in specific applications, for example, application 1, application i, application n etc. as shown in FIG. 1. More specifically, in the data integration process, the related synchronous data, i.e., synchronous data to be integrated, is generally determined based on the integration task. For example, as shown in FIG. 1, the synchronous data related to the integration task Job1 includes synchronous data in the business data tables S11 and S21. In addition, the data integration task can also involve time ranges, e.g., data integration task with respect to a time range such as [t1, t2].

However, in the data processing (i.e., data synchronization and data integration) process of the data analysis platform 102, the following problems may exist. As shown in FIG. 1, the data integration tasks Job1 and Jobi both depend on the data of the business data table S11 in the data lake layer 1021. Assume that when the data integration tasks Job1 and Jobi with respect to the time range [t1, t2] have been started, the original business data (i.e., the source data in the business platform) in the time range [t1, t2] to which the business data table S11 corresponds may not be fully synchronized to the data lake layer 1021 due to certain reasons (e.g., network delay, interrupt etc.) (i.e., the synchronous data deviates from the corresponding source data), which may result in missing errors in the integrated data obtained from integration based on these deviated synchronous data, i.e., the business data within the time range [t1, t2] corresponding to the subject area 1 and the subject area i in the data subject layer 1022. Such errors are not easy to be found actively. If the application ends (e.g., application 1 and application i as shown in FIG. 1) use the business data with the missing errors to perform analysis, it may result in inaccurate analysis results.

In order to solve the above problem, the present disclosure puts forth a data processing method so as to save the query time and increase the query efficiency effectively. In the data processing method according to the present disclosure, after data synchronization and before data integration, the additional step for synchronous data integrity verification are added and the subsequent data integration step is performed on the premise that the synchronous data integrity is ensured, so as to avoid errors in the subsequent data integration caused by data missing in the synchronization process, at the same time, timely and actively push abnormal conditions to the person in charge. Specifically, the synchronous data integrity (i.e., the data synchronization process was successfully completed without missing data) can be determined by monitoring the data offset (or data deviation) of the synchronous data obtained in the data synchronization process with respect to the corresponding source data in the business system. In some embodiments, the data processing method according to the present disclosure can be applied in project implementation, combined with ETL (Extract-Transform-Load, for describing the process of extracting, transforming and loading the data from the source end to the destination end) tool PDI (Pentaho Data Integration, a tool for data integration development), so as to form a complete process of automatically executing tasks, monitoring exceptions and triggering notifications, ensure data timeliness and integrity, and improve the data analysis quality.

Figure 2:
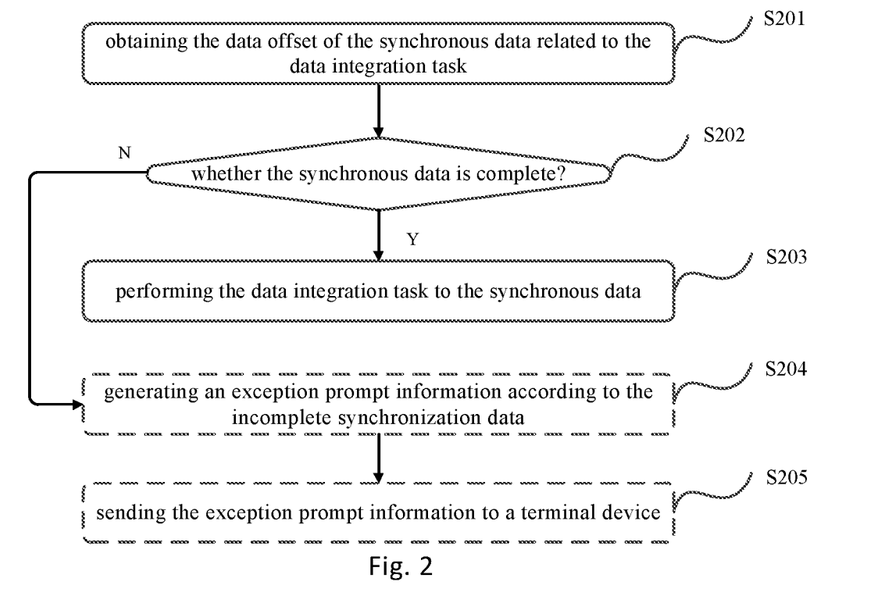
FIG. 2 shows a flow chart of a data processing method according to some embodiments of the present disclosure.

FIG. 2 schematically shows a flow chart of a data processing method according to some embodiments of the present disclosure. The data processing method can be performed by the data analysis platform 102 as shown in FIG. 1. As shown in FIG. 2, the data processing method according to some embodiments of the present disclosure can include steps S201-S203.

At step S201, obtaining, after data synchronization, the data offset of the synchronous data related to the data integration task to be performed. The data offset represents deviation of the synchronous data from the corresponding source data.

In some embodiments, before the data offset is obtained, it is necessary to determine the synchronous data related to the data integration task to be performed. Generally, the data integration task can be predetermined, and then the related synchronous data is determined according to the identification information of the data integration task (for instance, finding related synchronous data in the business data table obtained after data synchronization). For example, as shown in FIG. 1, the synchronous data related to the integration task Job1 includes the synchronous data in the business data tables S11 and S21; the synchronous data related to the integration task Jobi includes the synchronous data in the business data tables S22 and Sn1.

In some embodiments, the data offset can specifically represent the data item value deviation that can be generated in the process of copying (i.e., synchronizing) the original business data (i.e., the source data) stored in the business platform 101 to the analysis database of the data lake layer 1021 of the data analysis platform 102. For example, suppose that the business system 1 has a business data table S01 which includes ten business data items, the business data (i.e., source data) to which these ten business data items correspond are collected at 7:00 am to 8:00 am on Oct. 1, 2019. After copying or synchronizing these business data in the business system 1 to the analysis database of the data lake layer 1021, a business data table ods.S01 corresponding to the business data table S01 occurs in the analysis database. In the ods.S11, the copy of the source data (i.e., the synchronous data) is recorded correspondingly according to the business data items. Hence, by comparing S01 and ods.S01, the difference or deviation, i.e., data offset, of the data item values between the two tables S01 and ods.S01 can be obtained. The value of the data offset can represent the number of the missed data records in the business data table in the data synchronization process. For example, when the data offset is −3, it indicates that the synchronization data is missing 3 data records compared with the source data, i.e., there are 3 data records missed in the business data table in the data copying or synchronizing process.

In some embodiments, the data offset of the synchronous business data related to the data integration task can be calculated and stored in a particular data table (e.g., the data offset table) in advance before data integration and after data synchronization, thereby being capable of obtaining the data offset by calling the data table, so as to save the time required for data comparison and increase the overall efficiency of data processing.

At step S202, determining whether the synchronous data is complete according to the data offset.

After the data offset of the synchronous data related to the data integration task to be performed is obtained, it can be determined whether the synchronous data is complete or not according to the data offset, i.e., whether the related synchronous data is missing in the synchronization process. In other words, it can be determined whether there are failures or exceptions in the data synchronization phase and the resulting incomplete synchronization data by means of the data offset of the synchronous data from the corresponding source data. Afterwards, it can be determined whether the data integration task is triggered based on the synchronous data integrity. In some embodiments, if the data offset is zero, it shows that there is no difference or deviation between the synchronous data and the corresponding source data, and it can be considered that the synchronization process is completed normally, hence, the synchronous data is complete. While if the data offset is not zero, it shows that there is difference or deviation between the synchronous data and the corresponding source data and the data synchronization process fails or there are exceptions, at this time, the synchronous data can be considered incomplete or wrong. The causes of failure or exceptions of the synchronization process and incomplete or wrong synchronous data may include network interruption or exceptions, or data synchronization process exceptions etc.

At step S203, in response to the synchronous data being complete, performing the data integration task to the synchronous data.

After it is determined that the synchronous data is complete, it can be determined whether the data integration task is performed based on integrity of the synchronous data. To perform the integration task in the event that the synchronous data is complete can ensure the correctness of the result of the data integration task, so that the integrated data provided to the data subject layer (the data subject layer 1022 as shown in FIG. 1) is complete. In this way, the accuracy of the analysis result can be ensured when analyzing the business data at the application end using the subject areas (the subject area 1, . . . , the subject area n etc. as shown in FIG. 1). The subject area, i.e., subject field, refers to a data set constructed based on the department or special analysis purpose subjects. The boundary of the data set is determined by at least one subject and the business relationship in the enterprise. The subject can be determined based on the requirements of the analysis. For instance, the subject area corresponding to the subject built for product defects can store data for analyzing product defects.

In some embodiments, performing the data integration task can include extracting synchronous data (e.g. from the data lake layer 1021 as shown in FIG. 1), performing operations such as computing, emerging to it to obtain the integrated data, and write the obtained integrated data into the data subject layer (the data subject layer 1022 as shown in FIG. 1). In addition, correspondingly, in the case of incomplete synchronous data, the data integration task may not be performed and the corresponding abnormal conditions can be exhibited to the user or the person in charge. Specifically, please refer to the detailed descriptions on steps S204-S205 below.

In the data processing method according to some embodiments of the present disclosure, the additional step of synchronous data integrity verification is added after data synchronization and before data integration, wherein the synchronous data integrity (i.e., the data synchronization process is successfully completely without missing data) can be determined by monitoring the data offset (or data deviation) of the synchronous data obtained from the data synchronization process with respect to the corresponding source data in the business system, thereby being capable of performing the subsequent data integration step on the premise of ensuring integrity of the synchronous data, so as to avoid errors in the subsequent data integration caused by data missing in the synchronization process, ensure timeliness, integrity and accuracy of the data, and improve the quality of data processing and analysis.

As shown in FIG. 2, the data processing method according to some embodiments of the present disclosure can further comprise the steps of:

S204, in response to the synchronous data being incomplete, generating an exception prompt information according to the incomplete synchronization data;

S205, sending the exception prompt information to a terminal device.

As stated above, after determining integrity of the synchronous data related to the data integration task based on the data offset of the synchronous data, it can be determined based on the complete synchronous data whether to perform the data integration task, i.e., performing the corresponding data integration task when the synchronous data is complete. When the synchronous data is incomplete, the data integration task will not be performed and the corresponding abnormal conditions will be exhibited to the user or the person in charge. Specifically, as stated in steps S204-205, firstly, the exception prompt information for informing the user is generated based on the incomplete synchronous data, and then the user or the relevant person in charge is informed of the prompt information. The informing or noticing ways of the prompt information may include but not limited to: email push, instant messaging etc., wherein the instant messaging for example includes we-chat, short message, office software etc.

In this embodiment, it not only realizes automatic monitoring of the synchronous data integrity but also can trigger exception prompt notification in the event that the monitored synchronous data integrity is abnormal, thereby enabling the relevant user or person in charge to capture the relevant abnormal information timely so as to deal with the abnormal problems calmly, which realizes automatic monitoring of the data synchronization and data integration task, saves the task processing time, and increases the processing efficiency of the data integration task, thus a complete procedure of automatically performing tasks, monitoring exceptions and triggering notification is formed.

In some embodiments, the step S204—generating exception prompt information based on the incomplete synchronous data as shown in FIG. 2 may include: determining key information identifying the reason for the failure of the data integration task based on the incomplete synchronous data; determining the exception prompt information based on the key information. When it is determined that the synchronous data is incomplete, stopping the data integration task, i.e., indicating that the data integration task fails, hence, the relevant information on task failure can be recorded as the prompt information for informing the user.

Figure 3:
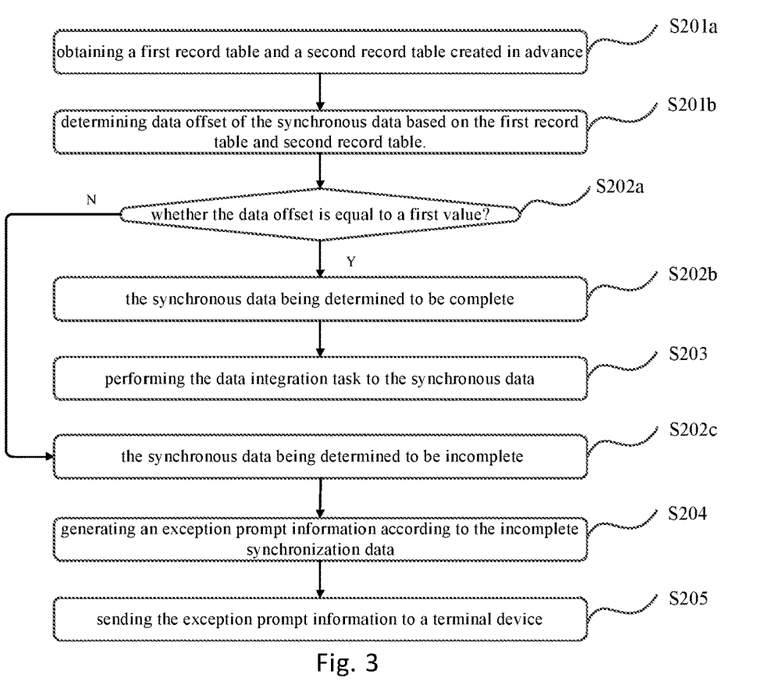
FIG. 3 shows a flow chart of a data processing method according to some embodiments of the present disclosure.

FIG. 3 shows a flow chart of a data processing method according to some embodiments of the present disclosure. As shown in FIG. 3, the method of FIG. 3 is an extension of FIG. 2, wherein compared with FIG. 2, FIG. 3 includes the same steps S203-S205 as FIG. 2, while S201 and S202 in FIG. 2 are extended as S201a-S201b and S202a-S202c respectively in FIG. 3.

As shown in FIG. 3, the step S201—obtaining data offset of synchronous data related to the data integration task to be performed after data synchronization may include:

S201a, obtaining a first record table and a second record table created in advance, wherein the first record table is used for recording deviation between (at least one) synchronous business data table and the corresponding source business data table, the second record table is used for recording a corresponding relationship between the data integration task and the synchronous business data table;

S201b, determining data offset of the synchronous data related to the data integration task to be performed based on the first record table and the second record table.

In some embodiments, the deviation between the synchronous business data table and the corresponding source data table can be recorded in advance in the data synchronization process before data integration, so as to form the first record table (which can also be called a synchronous offset record table), thereby being used to query data offset therefrom during data integration. In addition, since the first record table only involves the data synchronization process, it cannot be associated with the data integration task. Therefore, in order to obtain the data offset related to the data integration task, a second record table also has to be created in advance according to all determined data integration tasks, i.e., a corresponding relationship table between the data integration task and the synchronous business data table. The second record table is used for recording each data integration task and its related synchronous business data table, meanwhile, it can also record the type of the synchronous business data table, i.e., being an incremental synchronization table or a full synchronization table. In this way, when determining the data offset of the synchronous data related to the data integration task to be performed, the second record table can be queried firstly, so as to learn to which synchronous business data tables the data integration tasks to be performed are related. Then, the first record table is queried according to the names of the related synchronous business data tables, so as to obtain the record of the data offset of the corresponding synchronous data. The above method will be explained in detail below with reference to FIG. 4a and FIG. 4b.

As shown in FIG. 3, the step S202—determining whether the synchronous data is complete based on the data offset may include:

S202a, determining whether the data offset is equal to a first value;

S202b, in response to the data offset being equal to the first value, the synchronous data being determined to be complete;

S202c, in response to the data offset being not equal to the first value, the synchronous data being determined to be incomplete.

After the data offset is obtained, the integrity of the synchronous data can be determined by comparing the data offset with a preset threshold value. The preset threshold value (i.e., a first value) can for example be set as 0. When the data offset is equal to 0, it indicates that the synchronous business data copied in the data lake layer is same as the source business data stored in the business system, and there is no offset or deviation; when the data offset is not equal to 0, it indicates that the synchronous business data copied in the data lake layer is not same as the source business data stored in the business system, and the synchronization process is not successfully completed or there is deviation caused by exceptions. Optionally, the preset threshold value can also be set as a number with a smaller absolute value, so as to determine whether the synchronous data is complete based on whether the offset absolute value is smaller than the preset threshold value with a smaller absolute. In this way, the conditions for determining the integrity can be relaxed appropriately to provide a certain margin for inevitable errors and improve the fault tolerance rate.

Figure 4A:
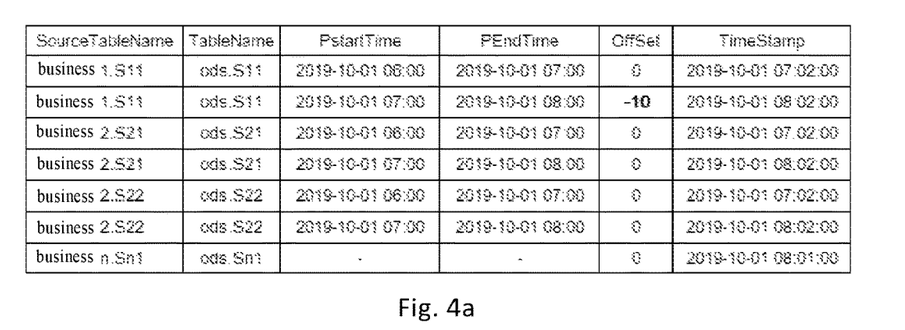
FIG. 4a and FIG. 4b respectively show a first record table and a second record table according to some embodiments of the present disclosure.
Figure 4B:
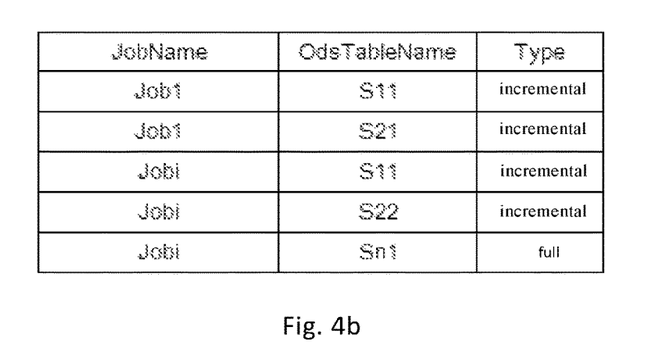

FIG. 4a and FIG. 4b respectively show a first record table and a second record table according to some embodiments of the present disclosure.

As shown in FIG. 4a, in the first record table (the synchronous offset record table), SourceTableName represents the names of the source business data tables stored in the business system; TableName represents the names of the synchronous business data tables copied from the source business data tables stored in the business system to the data lake layer via the synchronization process; PstartTime represents the start time of the current synchronization task; PEndTime represent the end time of the current synchronization task; Offset represents the data deviation or data offset between the corresponding synchronous business data table and the source business data table; TimeStamp represent the timestamp, i.e., the time of recording the data deviation of the current synchronization task.

As shown in FIG. 4b, JobName represents the names of the data integration tasks and OdsTableName represents the names of the synchronous business data tables corresponding to the data integration tasks. As shown in FIG. 4b, the integration task Job1 corresponds to two synchronous business data tables S11 and S21, while the integration task Jobi corresponds to three synchronous business data tables S11, S22, Sn1. In addition, as shown in FIG. 4b, the field Type represents the types of the synchronous business data tables. As shown in FIG. 4b, S11, S21, and S22 belong to the incremental synchronization table, and Sn1 belongs to the full synchronization table.

Figure 4C:
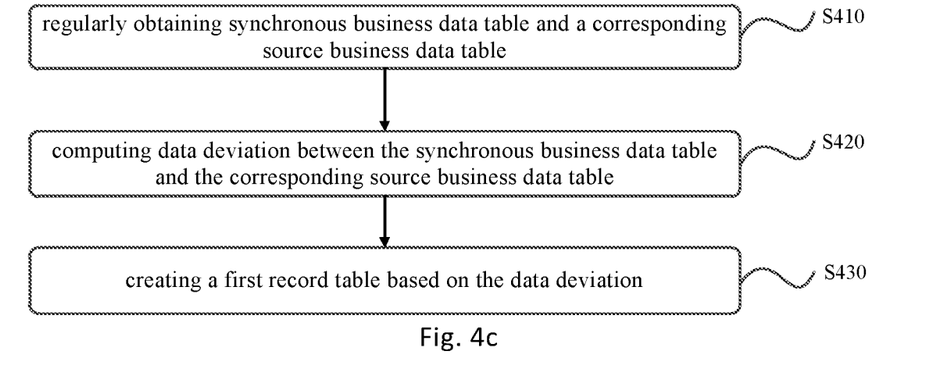
FIG. 4c and FIG. 4d show a creating method of the first record table according to some embodiments of the present disclosure.

FIG. 4c shows a creating method of the first record table according to some embodiments of the present disclosure. As shown in FIG. 4c, the first record table can be created through the following steps:

S410, obtaining a synchronous business data table and a corresponding source business data table regularly;

S420, computing data volume deviation between the synchronous business data table and the corresponding source business data table;

S430, creating the first record table based on the data volume deviation.

In some embodiments, as shown in S410 and 420, the data volume deviation of the synchronous data table can be computed regularly for example as needed according to a preset frequency or period (e.g., as shown in FIG. 4a, the preset frequency is 1 hour, i.e., computing the data volume deviation every 1 hour), i.e., subtracting the data volume of the corresponding source business data table from the data volume of the synchronous business data table, storing the result in the first record table (or the synchronous offset record table) as shown in FIG. 4a, so as to create the first record table.

Figure 4D:
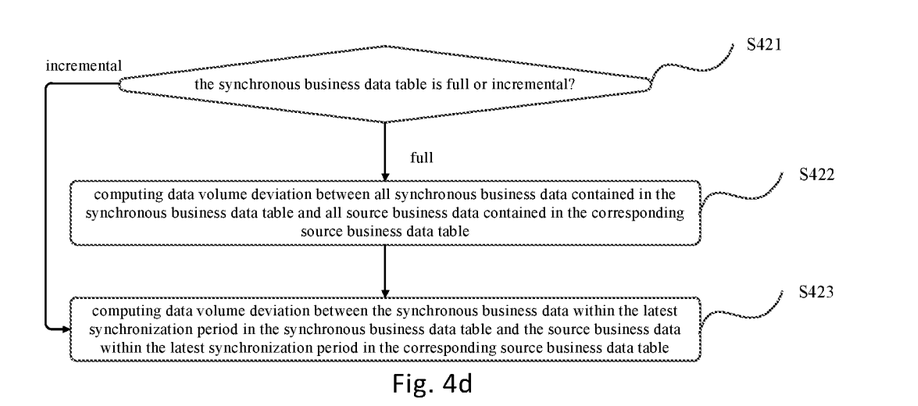

FIG. 4d shows a creating method of a first record table according to some embodiments of the present disclosure. As shown in FIG. 4d, the step S420—computing data volume deviation between the synchronous business data table and the corresponding source business data table may include:

S421, determining whether the synchronous business data table is a full synchronization table or an incremental synchronization table, S422, in response to the synchronous business data table being a full synchronization table, computing data volume deviation between all synchronous business data contained in the synchronous business data table and all source business data contained in the corresponding source business data table;

S423, in response to the synchronous business data table being an incremental synchronization table, computing the data volume deviation between the synchronous business data within the latest synchronization period in the synchronous business data table and the source business data within the latest synchronization period in the corresponding source business data table.

Generally, as shown in FIG. 4b, the data synchronization process can include two synchronization ways, i.e., full synchronization and incremental synchronization, wherein the full synchronization synchronizes all data at one time, while the incremental synchronization only synchronizes different parts between the source data and the synchronous data (e.g., the source business data table and the synchronous business data table). Correspondingly, the synchronous business data table can include an incremental synchronization table and a full synchronization table. The full synchronization table can be used for storing data of basic business, while the incremental synchronization table can be used for storing business data updated in real time. When computing the data offset, for the incremental synchronization table, only the data within a particular time range (e.g., within the latest synchronization period) related to the task needs to be computed; while for the full synchronization table, the data of the full table need to be computed. For example, as shown in FIGS. 4a and 4b, the synchronization of Business1.S11 in the source business data table to the synchronous business data table ods.S11 belongs to incremental synchronization, the data volume deviation from 6 o'clock to 7 o'clock computed at 7:02 is 0, and the data volume deviation from 7 o'clock to 8 o'clock computed at 8:02 is −10; the synchronization of Businessn.Sn1 to ods.Sn1 belongs to full synchronization, and the data volume deviation is computed at one minute past each o'clock, e.g. at 8:01 as shown in FIG. 4a.

Figure 5:
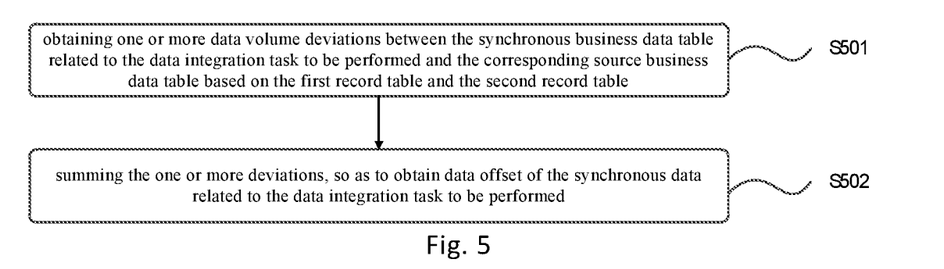
FIG. 5 shows a flow chart of a data processing method according to some embodiments of the present disclosure.

FIG. 5 shows a flow chart of a data processing method according to some embodiments of the present disclosure. As shown in FIG. 5, the step S201b—determining the data offset of the synchronous data related to the data integration task to be performed based on the first record table and the second record table may include:

S501, obtaining one or more data volume deviations between the synchronous business data table related to the data integration task to be performed and the corresponding source business data table based on the first record table and the second record table;

S502, summing the one or more deviations to obtain the data offset of the synchronous data related to the data integration task to be performed.

As shown in FIG. 4a and FIG. 4b, for instance, the data integration task to be performed is Job1, it can be seen, by querying the second record table shown in FIG. 4b, that the synchronous business data tables related to Job1 are S11 and S21, and both of them are incremental synchronization tables. Subsequently, it can be seen by querying the first record table shown in FIG. 4a, that the field Offset of ods.S11 (corresponding to S11 in the second record table) and ods.S21 (corresponding to S21 in the second record table) includes four records, i.e., the first four records of the first record table. Consequently, when Job1 needs to extract the synchronous data of the business time [7:00, 8:00], the corresponding data offset is equal to the sum of the second and the fourth records in the field Offset of the first record table, i.e., −10+0=−10; while when Job1 needs to extract the synchronous data of the business time [6:00, 7:00], the corresponding data offset is equal to the sum of the first and the third records in the field Offset of the first record table, i.e., 0+0=0. If the Job1 needs to extract the synchronous data of the business time [6:00, 8:00], the data offset of the synchronous data involved by the integration task Job1 includes all the first four Offset records in the first record table (which are 0, −10, 0, 0 in sequence from top to bottom), hence, the computed data offset of the synchronous data related to the data integration task Job1 to be performed is the sum of the above four Offset records, i.e., 0+(−10)+0+0=−10.

Figure 6:
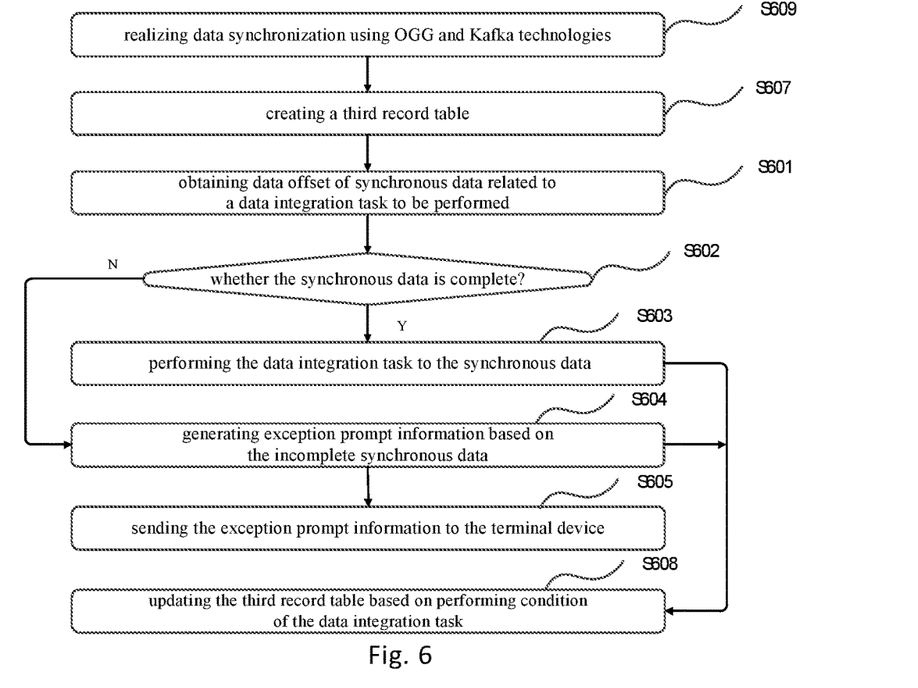
FIG. 6 shows a flow chart of a data processing method according to some embodiments of the present disclosure.

FIG. 6 shows a flow chart of a data processing method according to some embodiments of the present disclosure. As shown in FIG. 6, the steps S601-605 are respectively same as S201-205 of FIG. 2, which will not be repeated here. Compared to FIG. 2, the data processing method can further comprise the following steps S607 and S608.

At S607, creating a third record table before obtaining the data offset of the synchronous data related to the data integration task to be performed. The third record table is used for recording the status and the result of each scheduling and performing of the data integration task to be performed. The third record table can also be called the data integration task schedule record table, which includes but not limited to the following fields: task name, task schedule frequency record, the start time and end time of the current scheduled business of the task, task state identification, abnormal information (e.g., reason for task failure), time range of the current scheduled business of the task (end time minus start time), time record of inserting or updating data.

At S608, updating the third record table based on the performing condition of the data integration task to be performed. The step S608 can include: updating the task state identification in the third record table in response to whether the data integration task to be performed is performed or not; and writing the exception prompt information into the third record table after generating the exception prompt information.

The above method steps will be explained in detailed below with reference to FIGS. 7a and 7b.

Figure 7A:
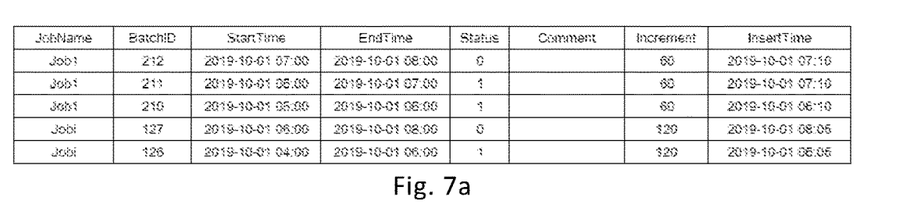
FIG. 7a shows a third record table according to some embodiments of the present disclosure.
Figure 7B:
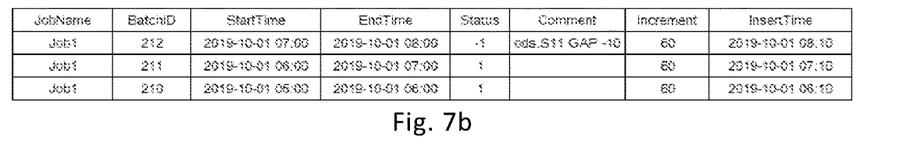
FIG. 7b shows a third record table according to some embodiments of the present disclosure.

FIGS. 7a and 7b show examples of the third record table according to some embodiments of the present disclosure. Table 1 shows the meaning of each field in the third record table as shown in FIGS. 7a and 7b. As shown in Table 1, in the third record table, JobName represents the name of the data integration task; BatchID represents the frequency record of the current task being scheduled, plus 1 on the last BatchID each time it is scheduled; StartTime represents the start time of the current scheduled business, which is transferred to the variable V$START_TIME in the task stream; EndTime represents the end time of the current scheduled business, which is transferred to the variable V$END_TIME in the task stream; Status represents a state identification of the data integration task, for example, 0 represents not performed, 1 represents successfully performed, −1 represents performing failed or in progress. Comment represents abnormal information, e.g., if the task performing fails, the reason for task failure can be written; Increment represents time range of each scheduled business of the data integration task, i.e., EndTime-StartTime, the unit is min; InsertTime represents time of inserting or updating the data.

TABLE 1

| | |
|---|---|
| JobName | Task name |
| BatchID | frequency record of the current task being scheduled, plus 1 on the last BatchID each time |
| StartTime | start time of the current scheduled business, which is transferred to the variable V$START_TIME in the task stream |
| EndTime | end time of the current scheduled business, which is transferred to the variable V$END_TIME in the task stream |
| Status | task state identification, 0 = not performed, 1 = successfully performed, −1 = performing failed or in progress |
| Comment | if the task performing fails, the reason for task failure is written |
| Increment | time range of each scheduled business, i.e., EndTime-StartTime, the unit is min |
| InsertTime | Recording the Insert or Update time |

As shown in FIGS. 7a and 7b, the third record table is used for recording the scheduling and performing state and result of the data integration task, so that it can be learnt from this table the real-time scheduling and performing conditions of the corresponding task. When the task is completed, the parameters of fields such as Status and the BatchID and so on need to be updated and when a new task is inserted, the parameters as shown in Table 1 have to be inputted again. For example, FIG. 7a can represent the original schedule record, and FIG. 7b represents the updated schedule record on the basis of FIG. 7a. As shown in FIG. 7b, compared to FIG. 7a, the parameter of Status corresponding to the data integration task Job1 and BatchID=212 in the first line changes from 0 to −1, and ods.S11 2019-10-01 07:00~2019-10-01 08:00 GAP −10 is written in the corresponding Comment, which shows that the data integration task in the time range of 7 o'clock to 8 o'clock on Oct. 1, 2019 fails and the data offset is −10. In addition, the content in the Comment can be read directly from the third record table as the email content or the short message content which is sent to the person in charge of the relevant business.

As shown in FIG. 6, besides steps S601-S608, before the steps S601 and S607, the data processing method can further include:

S609, realizing data synchronization using OGG and Kafka technologies.

The Oracle Golden Gate (OGG) is a log based structured data replication software. The OGG obtains data change by capturing the online redo log or archive log of the source database, so as to form tails, and then transmits these tails to the target database through network protocols. The target end is parsed and inserted into the target end database, so as to realize the data synchronization between the source end and the target end. Kafka is an open source stream processing platform and high throughput distributed publish subscribe message system, which can process all the action flow data of consumers in the website.

In some embodiments, the step S206 can include: extracting the incremental change data corresponding to the source data table; writing the incremental change data into a local file; reading from the local file the incremental change data which is pushed to the Kafka message queue; obtaining business data stored in the Kafka message queue and copying it to the corresponding synchronous business data table.

The data synchronization way based on OGG+Kafka provided in the above embodiment can realize a second-level cross-platform data synchronization from the relational database of the business platform to the data lake layer of the data analysis platform. For a business data table with a large amount of business data, the data synchronization realized in the manner of OGG+Kafka can save the synchronization time more effectively than the periodic off-line data acquisition manner and ensures a more timely business display result. This manner can trigger business message replication when business data changes or arrives, thereby realizing data synchronization quickly and achieving a second-level cross-platform data synchronization.

In some embodiments, the step S609 can include storing the synchronous data using the distributed database. In the data synchronization process, the synchronous data copied from the business system to the data lake layer needs to be stored in the analysis database. The analysis database can for example use distributed databases such as KUDU database, Hbase database etc., in this way, the data can be analyzed more quickly and timely when the date is updated. Compared with the Hive database, for a business table with a large amount of updated records, the distributed database is more convenient to be processed. For example, only updated row records need to be processed on the KUDU database, while the data in the corresponding range on the Hive database needs to be deleted first and then loaded again. Hence, the above distributed databases can be used in the embodiments provided in the present disclosure so as to increase the operation efficiency of the data table and make the operation more concise. For example, for local data changes in the full synchronization table, the data table can be updated only by modifying the row vectors for local data changes.

In the above step, the embodiments of the present disclosure can automatically monitor the task stream of the data integration task to increase the operation efficiency of the data analysis platform, so as to realize automatic monitoring of the task performing and abnormal state, and trigger the notification automatically when an exception is monitored.

Figure 8:
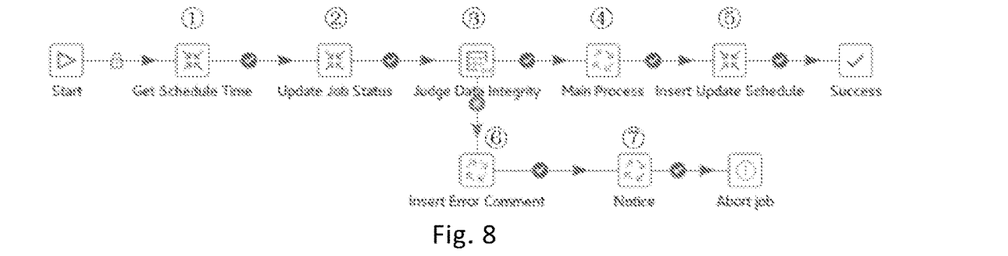
FIG. 8 shows an example flow chart of a data processing method carried out based on ETL tool PDI according to some embodiments of the present disclosure.

FIG. 8 shows an exemplary flow chart of a data processing method carried out based on ETL tool PDI according to some embodiments of the present disclosure.

As shown in FIG. 8, the node $\hat{1}$ (Get Schedule Time) in the flow chart is used for obtaining the time range of the business data to be processed by the scheduling of the data integration task. The Job1 is taken as an example of the data integration task thereinafter to explain the specific process of the data processing method according to some embodiments of the present disclosure. As stated above, the third record table (i.e., the data integration task scheduling record table) as shown in FIG. 7a or 7b can be used to obtain said scheduling time range.

The time range of the business data to be processed by this scheduling can be obtained based on the task name Job1 and the schedule frequency identification BatchID of the data integration task. For example, the maximum schedule frequency identification corresponding to the current task name Job1 is selected as the currently designated data integration task. Referring to FIG. 7a, regarding the integration task Job1, in the first record BatchID=212 (maximum), this record is namely the newly inserted (i.e., data integration task to be performed) after the last data integration task is successfully performed. Subsequently, the BatchID, StartTime and EndTime values in the data integration task scheduling record table are assigned to the global variables V$BATCH_ID, V$START_TIME and V$END_TIME in Job1 respectively, so as to update these variables.

As shown in FIG. 8, the node $\hat{2}$ (Update Job Status) in the flow chart is used for updating the status of the data integration task. After the above global variable assignment is completed, Job1 task stream has been started. In order to avoid task conflict, Job 1 in the data integration task scheduling record table needs to correspond to the recorded task status identification Status. As shown in FIG. 7b, compared to FIG. 7a, the field Status in the first record is updated from 0 (i.e., not performed) to −1 (i.e., the task is being performed).

As shown in FIG. 8, the node $\hat{3}$ (Judge Data Integrity) in the flow chart is used for determining integrity of the synchronous data, i.e., determining whether the synchronous data related to the data integration task Job1 in the synchronous business data table is complete. Referring to FIG. 5, the synchronous data offset can be computed based on the first record table (i.e., the synchronous offset record table) and the second record table (i.e., the corresponding relationship table between the data integration task and the synchronous business data table) as shown in FIGS. 4a-4b, and then determine data integrity based on the offset. Suppose that ZOffset represents synchronous data offset, then ZOffset=0, which indicates that the synchronous data associated with the data integration task Job1 is complete, then the subsequent node $\hat{4}$ and node $\hat{5}$ in the flow chart are performed successively to complete data integration successfully. Otherwise, if ZOffset≠0, the synchronous data associated with the data integration task Job1 is incomplete, then the subsequent node $\hat{6}$ and node $\hat{7}$ are performed, so as to complete the exception notification (or abnormal information) processing.

In some embodiments, the data offset ZOffset of the synchronous data associated with the data integration task Job1 can be computed according to the following formula:

$$ZOffset = \sum_{i=1}^{k} Offset_i$$

wherein i represents the ith business data table associated with the data integration task Job1, k represents the sum of the business data tables associated with the data integration task Job1.

For the incremental synchronization tables, all related tables during V$START_TIME and V$END_TIME can be screened out to determine the set of business data tables associated with the data integration tasks Job. For the full synchronization tables, only the Offset values corresponding to the row records with data changes need to be taken.

Referring to FIGS. 4a and 4b, for the data integration task Job1, it is related to two business data tables ods.S11 and ods.S21, and the last scheduling of Job1 needs to extract the data of business time [7:00, 8:00]. Hence, the Job1 related data offset ZOffset is equal to the sum of the offsets of ods.S11 and ods.S21 during [7:00, 8:00], i.e., ZOffset=(−10)+(0)=−10.

As shown in FIG. 8, the node $\hat{4}$ (Main Process) in the flow chart is used for performing the data integration task Job1. In response to the return result that ZOffset is 0 in the node $\hat{3}$, i.e., the synchronous data is complete, proceed to the node $\hat{4}$ to complete the data integration task Job1, so as to realize the data integration processing process of the business data during V$START_TIME and V$END_TIME required by the subject area 1, and write the integrated data into the corresponding subject area 1.

As shown in FIG. 8, the node $\hat{5}$ (Insert Update Schedule) in the flow chart is used for updating the third record table (i.e., the data integration task scheduling table) after the integration task Job1 is completed. Proceeding to the node $\hat{5}$ indicates that the current scheduling of the data integration task Job1 has been successfully completed, at this time, the task status identifications of the items in the data integration task scheduling record table are updated, meanwhile, a new task record is inserted to define the necessary parameter values of the next task scheduling of Job1.

Figure 9:
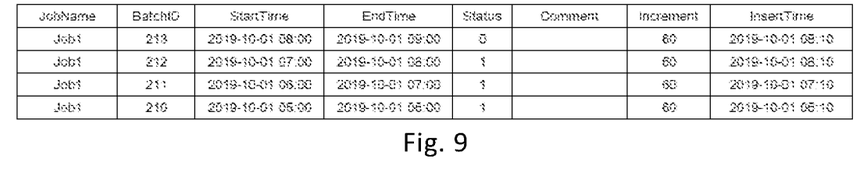
FIG. 9 shows a third record table according to some embodiments of the present disclosure.

FIG. 9 shows a third record table according to some embodiments of the present disclosure. As shown in FIG. 9, after the current scheduling task (BatchID is 212) of Job1 is completed, compared with FIG. 7b, the Status of the currently completed scheduling task is updated as 1 (i.e., successfully performed), meanwhile, a new scheduling task Job1 is inserted at the top, wherein BatchID is 213, Status is 0 (i.e., not performed), StartTime and EndTime are respectively 8:00 and 9:00 2019-10-01.

As shown in FIG. 8, the node $\hat{6}$ (Insert Error Comment) in the flow chart is used for writing the abnormal information in the third record table (i.e., the data integration task scheduling record table) in the event that the synchronous data is incomplete. With respect to the first record table (i.e., the synchronous offset record table), all row records of Offset≠0 are extracted and merged into character strings containing key information which are written into the Comment field of the data integration task scheduling record table, i.e., when the data offset involved by the task Job1 is not zero, writing the relevant condition of this offset into the Comment field as abnormal information. As shown in FIGS. 4a and 7b, Offset=−10 appears in the second record of the first record table of FIG. 4a, correspondingly, ods.S11 GAP −10 is written into the Comment field of the third record table of FIG. 7b.

As shown in FIG. 8, the node $\hat{7}$ (Notice) in the flow chart is used for starting the automatic prompt process, i.e., reading the Comment field with the task name Job1 and BatchID=212 in the data integration task scheduling record table (i.e., the third record table), and informing the person in charge of the content of the Comment field by email or short message. As shown in FIG. 8, after the node, the data integration task such as Job1 is aborted.

The present disclosure realizes automatic monitoring process of the data integration task, increases the efficiency of the data integration task effectively, and improves the quality of data analysis by means of automatic scheduling of the data integration task, automatic verification to data integrity and notification of abnormal information.

The flow charts and the block diagrams in the drawings illustrate the architectures, functions and operations that may be carried out by the systems, methods and computer program products according to various embodiments of the present disclosure. In this regard, each block in the flow chart or the block diagram can represent a part of a module, a program segment or a code, the part of the module, the program segment or the code comprises one or more executable instructions for implementing the specified logical functions. It shall be also noted that in some alternative implementations, the functions labeled in the blocks may also occur in a sequence different from that labeled in the drawings. For example, two successively represented blocks actually can be performed essentially in parallel, they can also be performed in a reverse order sometimes, which depends on the functions involved. It shall be further noted that each block in the block diagram and/or the flow chart as well as the combination of the blocks in the block diagram and/or the flow chart can be carried out by the dedicated hardware based system for implementing the specified functions or operations, or be carried out by the combination of dedicated hardware and the computer instructions.

Figure 10:
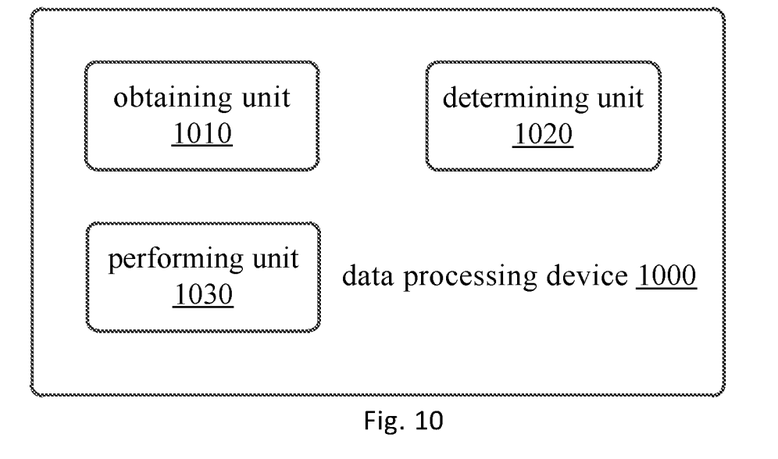
FIG. 10 shows a structural block diagram of a data processing device according to some embodiments of the present disclosure.

FIG. 10 shows a structural block diagram of a data processing device according to some embodiments of the present disclosure. As shown in FIG. 10, the data processing device 1000 may comprise an obtaining unit 1010, a determining unit 1020, and a performing unit 1030.

The obtaining unit 1010 can be configured to, after data synchronization, obtain data offset of the synchronous data related to the data integration task to be performed, the data offset representing deviation of the synchronous data from the corresponding source data. The determining unit 1020 can be configured to determine whether the synchronous data is complete based on the data offset. The performing unit 1030 can be configured to, in response to the synchronous data being complete, perform the data integration task to the synchronous data.

It shall be noted that the above various units can be implemented in software or hardware or a combination of both. A plurality of different units can be implemented in a same software or hardware structure, or one unit can be implemented by a plurality of different software hardware structures.

In the data processing device according to some embodiments of the present disclosure, the integrity of the synchronous data (i.e., the data synchronization process is successfully completed without data missing) is determined by monitoring data offset (or data deviation) of the synchronous data obtained in the data synchronization process with respect to the corresponding source data in the business system, thereby being capable of performing subsequent data integration task on the premise of ensuring integrity of the synchronous data, so as to avoid errors in the subsequent data integration due to data missing in the synchronization process, ensure timeliness, integrity and accuracy of the data, and improve the quality of data processing and analysis.

Figure 11:
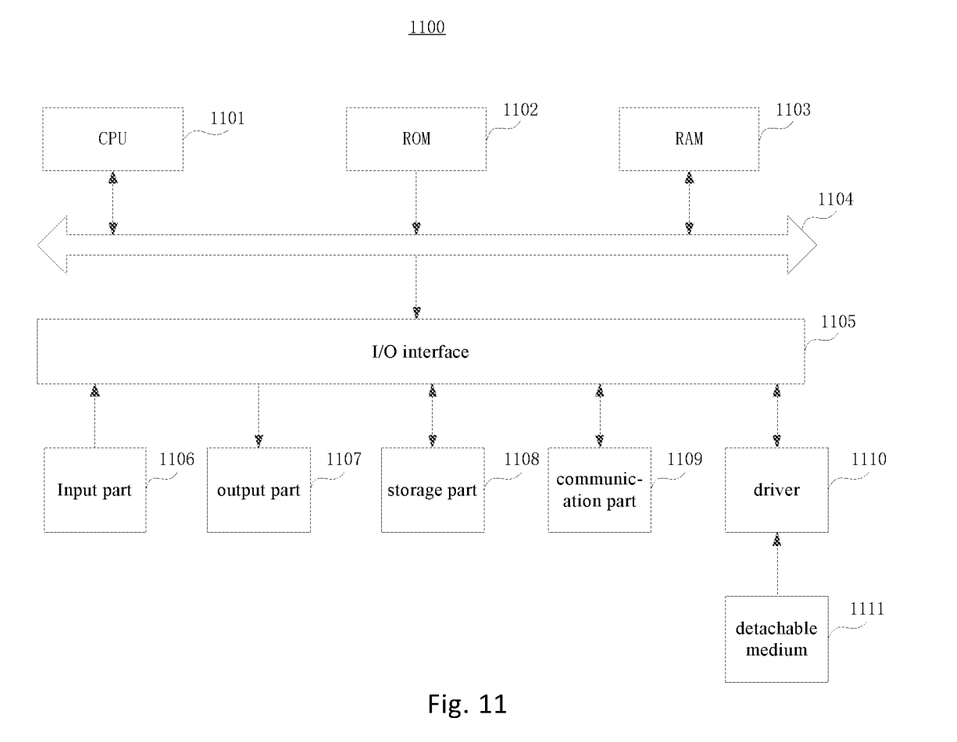
FIG. 11 shows a structural block diagram of a computing device according to some embodiments of the present disclosure.

FIG. 11 schematically shows an exemplary block diagram of a computing device 1100 according to some embodiments of the present disclosure. The computing device 1100 can represent a device for implementing various means or modules described herein and/or carrying out various methods described herein. The computing device 1100 can be for example a server, a desktop computer, a laptop computer, a tablet computer, a smart phone or any other appropriate computing devices or computing systems, which can include devices of various levels from full resource devices with large storage and processing resources to low resource devices with limited storage and/or processing resources. In some embodiments, the data processing device 1000 described with respect to FIG. 10 can be implemented in one or more computing devices 1100 respectively.

As shown in FIG. 11, the computing device comprises a central processing unit (CPU) 1101, which can execute various appropriate actions and processing based on the programs stored in a read-only memory (ROM) 1102 or the programs loaded from a storage part 1108 to a random access memory (RAM) 1103. In RAM 1103, various programs and data required by system operations are also stored. The CPU 1101, the ROM 1102 and the RAM 1103 are connected to each other through a bus 1104. An input/output (I/O) interface 1105 is also connected to the bus 1104.

The following components are connected to the I/O interface 1105: an input part 1106 such as keyboard, mouse etc.; an output part 1107 such as a cathode-ray tube (CRT), a liquid crystal display (LCD) and a loudspeaker etc.; a storage part 1108 including hard disk etc.; and a communication part 1109 including network interface cards such as LAN card, modem etc. The communication part 1109 performs communication processing via networks such as Internet. A driver 1110 is also connected to the I/O interface 1105 as needed. A detachable medium 1111, such as a magnetic disc, an optical disc, a magnetic optical disk, a semiconductor memory and so on, is mounted on the driver 1110 as needed, so that the computer program read from it can be installed into the storage part 1108 as needed.

Particularly, according to an embodiment of the present disclosure, the above process described with reference to the flow chart of FIG. 2 can be implemented as a computer software program. For example, an embodiment of the present disclosure comprises a computer program product, which comprises a computer program carried on a machine-readable medium, the computer program comprising program codes for carrying out the method as shown in the flow chart. In such an embodiment, the computer program can be downloaded and installed from the network through the communication part 1109, and/or installed from the detachable medium 1111. When the computer program is executed by the central processing unit (CPU) 1001, the functions defined in the device or system of the present disclosure are performed.

It should be noted that the computer readable medium as shown in the present disclosure can be a computer readable signal medium or a computer readable storage medium or any combination of the above two. The computer readable storage medium for example can be, but not limited to: electrical, magnetic, optical, electromagnetic, infrared, or semiconductor systems, apparatuses or devices, or any combination of the above. The more specific examples of the computer readable storage medium can include but not limited to: an electrical connection with one or more conductors, a portable computer disk, a hard disk, a random access memory (RAM), a read only memory (ROM), a erasable programmable read only memory (EPROM or a flash memory), an optical fiber, a portable compact disk read only memory (CD-ROM), a light storage device, a magnetic storage device, or any appropriate combination of the above. In the present disclosure, the computer readable storage medium can be any tangible medium containing or storing programs, which programs can be used by the instruction execution system, apparatus or device or by combinations thereof. Moreover, in the present disclosure, the computer readable signal medium can include a data signal that propagates in baseband or as part of a carrier wave, in which computer-readable program codes are carried. Such propagated data signal can take various forms, including but not limited to electromagnetic signal, optical signal or any appropriate combination of the above. The computer readable signal medium can also be any computer readable medium other than the computer readable storage medium. The computer readable medium can send, propagate or transmit programs used by the instruction execution system, apparatus or device or used by combinations thereof. The program codes contained on the computer readable medium can be transmitted by any appropriate mediums, including but not limited to: wireless, wire, optical cable, RF, etc., or any appropriate combination of the above.

As another aspect, the present disclosure further provides a computer readable storage medium. The computer readable storage medium can be either comprised in the computing device described in the above embodiments, or can exist alone without being assembled into the computing device. The above computer readable storage medium stores one or more programs, which are used by one or more processors for performing the data processing method described in the present disclosure.

The above description is merely preferred embodiments of the present disclosure and explanations on the applied technical principles. Those skilled in the art should understand that the disclosure scope involved in the present disclosure is not limited to the technical solution formed by particular combinations of the above technical features, it should also cover, in the case of not departing from the preceding concept disclosed, other technical solutions formed by any combination of the above technical features or the equivalent features thereof, for example, technical solutions formed by mutual replacement of the above features and technical features disclosed in the present disclosure (but not limited to) with similar functions.

In the description of this Specification, the terms "one embodiment", "some embodiments", "an example", "a specific example", or "some examples" intend to indicate that the specific features, structure, materials or characteristics described in combination with the embodiment or example are comprised in at least one embodiment or example of the present disclosure. In this Specification, the schematic expressions of the above terms need not be directed to the same embodiment or example. Moreover, the specific features, structure, materials or characteristics described can be combined in an appropriate manner in any one or more embodiments or examples. In addition, in the case of without contradiction, those skilled in the art can combine different embodiments or examples as well as features of different embodiments or examples described in this Specification.

It should be appreciated that the respective parts of the present disclosure can be implemented by hardware, software, firmware or their combinations. In the above implementation, a plurality of steps or methods can be carried out by software or firmware that is stored in the memory and executed by an appropriate instruction execution system. For example, if it is carried out by hardware, it can be carried out by any of the following well known technologies of the art or their combinations: discrete logic circuit with logic gate circuit for realizing logic function on data signal, application specific integrated circuit with suitable combinational logic gate circuit, programmable gate array, field programmable gate array and so on.

The ordinary skilled person in the art can understand that all or part of the steps of the method in the above embodiment can be performed by program instruction related hardware. When executed, the program is able to carry out one or a combination of the steps of the method embodiment.

In addition, the functional units in each embodiment of the present disclosure can be integrated in one processing module, or each unit physically exists separately, or two or more units are integrated in one module. The above integrated module can be either implemented in the form of hardware or in the form of a software functional module. The integrated module, if implemented in the form of a software functional module and sold or used as an independent product, can also be stored in a computer readable storage medium.

The invention claimed is:

1. A data processing method, comprising:
obtaining, after data synchronization, data offset of synchronous data related to a data integration task to be performed, the data offset representing deviation of the synchronous data from corresponding source data, wherein the synchronous data is obtained based on the source data through the data synchronization;
determining whether the synchronous data is complete based on the data offset; and
in response to the synchronous data being complete, performing the data integration task to the synchronous data,
wherein the data integration task comprises integrating the synchronous data related to a target subject to obtain integrated data, and writing the integrated data into a subject area corresponding to the target subject,
wherein, the obtaining, after data synchronization, data offset of synchronous data related to a data integration task to be performed comprises:
obtaining a first record table and a second record table created in advance, wherein the first record table is used for recording data volume deviation between a synchronous business data table and a corresponding source business data table, and the second record table is used for recording a corresponding relationship between the data integration task and the synchronous business data table; and
determining the data offset of the synchronous data related to the data integration task to be performed based on the first record table and the second record table.

2. The method according to claim 1, further comprising:
in response to the synchronous data being incomplete, generating exception prompt information based on the incomplete synchronous data; and
sending the exception prompt information to a terminal device.

3. The method according to claim 2, wherein the generating exception prompt information based on the incomplete synchronous data comprises:
determining key information identifying a reason for failure of the data integration task based on the incomplete synchronous data; and
determining the exception prompt information based on the key information.

4. The method according to claim 1, wherein the first record table is created by the following operations:
regularly obtaining a synchronous business data table and a corresponding source business data table;
computing data volume deviation between the synchronous business data table and the corresponding source business data table; and
creating the first record table based on the data volume deviation.

5. The method according to claim 1, wherein the determining the data offset of the synchronous data related to the data integration task to be performed based on the first record table and the second record table comprises:
obtaining one or more data volume deviations between the synchronous business data table related to the data integration task to be performed and the corresponding source business data table based on the first record table and the second record table; and
summing the one or more data volume deviations, so as to obtain data offset of the synchronous data related to the data integration task to be performed.

6. The method according to claim 4, wherein the computing data volume deviation between the synchronous business data table and the corresponding source business data table comprises:
determining whether the synchronous business data table is a full synchronization table or an incremental synchronization table;
in response to the synchronous business data table being a full synchronization table, computing data volume deviation between all synchronous business data contained in the synchronous business data table and all source business data contained in the corresponding source business data table; and
in response to the synchronous business data table being an incremental synchronization table, computing data volume deviation between the synchronous business data within the latest synchronization period in the synchronous business data table and the source business data within the latest synchronization period in the corresponding source business data table.

7. The method according to claim 1, further comprising:
before obtaining data offset of synchronous data related to a data integration task to be performed, realizing data synchronization using Oracle Golden Gate (OGG) and Kafka technologies.

8. The method according to claim 7, further comprising:
storing the synchronous data using a distributed database.

9. The method according to claim 1, further comprising:
before obtaining data offset of synchronous data related to a data integration task to be performed, creating a third record table, the third record table being used for recording a status and a result of each scheduling and performing of the data integration task to be performed; and
updating the third record table based on the performing of the data integration task to be performed.

10. The method according to claim 1, wherein the determining whether the synchronous data is complete based on the data offset comprises:
in response to the data deviation being equal to a first value, the synchronous data being determined as complete; and
in response to the data deviation being not equal to the first value, the synchronous data being determined as incomplete.

11. A data processing device, comprising:
an obtaining unit, configured to obtain, after data synchronization, data offset of synchronous data related to a data integration task to be performed, the data offset representing a deviation of the synchronous data from corresponding source data, wherein the synchronous data is obtained based on the source data through the data synchronization;
a determining unit, configured to determine whether the synchronous data is complete based on the data offset; and
a performing unit, configured to, in response to the synchronous data being complete, perform the data integration task to the synchronous data,
wherein the data integration task comprising integrating the synchronous data related to a target subject to obtain integrated data, and writing the integrated data into a subject area corresponding to the target subject, and
wherein, the obtaining unit is further configured to, after the data synchronization:
obtain a first record table and a second record table created in advance, wherein the first record table is used for recording data volume deviation between a synchronous business data table and a corresponding source business data table, and the second record table is used for recording a corresponding relationship between the data integration task and the synchronous business data table; and
determine the data offset of the synchronous data related to the data integration task to be performed based on the first record table and the second record table.

12. A computing device, comprising:
a processor; and
a memory with instructions stored thereon, the instructions, when executed on the processor, causing the processor to carry out operations comprising:
obtaining, after data synchronization, data offset of synchronous data related to a data integration task to be performed, the data offset representing deviation of the synchronous data from corresponding source data, wherein the synchronous data is obtained based on the source data through the data synchronization;
determining whether the synchronous data is complete based on the data offset; and
in response to the synchronous data being complete, performing the data integration task to the synchronous data,
wherein the data integration task comprising integrating the synchronous data related to a target subject to obtain integrated data, and writing the integrated data into a subject area corresponding to the target subject, and
wherein, the obtaining, after data synchronization, data offset of synchronous data related to a data integration task to be performed comprises:
obtaining a first record table and a second record table created in advance, wherein the first record table is used for recording data volume deviation between a synchronous business data table and a corresponding source business data table, and the second record table is used for recording a corresponding relationship between the data integration task and the synchronous business data table; and
determining the data offset of the synchronous data related to the data integration task to be performed based on the first record table and the second record table.

13. The computing device according to claim 12, wherein the operations further comprises:
in response to the synchronous data being incomplete, generating exception prompt information based on the incomplete synchronous data; and
sending the exception prompt information to a terminal device.

14. The computing device according to claim 13, wherein the generating exception prompt information based on the incomplete synchronous data comprises:
determining key information identifying a reason for failure of the data integration task based on the incomplete synchronous data; and
determining the exception prompt information based on the key information.

15. A non-transitory computer readable storage medium with a computer program stored thereon, the computer program being used for carrying out the method according to claim 1.

16. A non-transitory computer readable storage medium with a computer program stored thereon, the computer program being used for carrying out the method according to claim 2.

17. A non-transitory computer readable storage medium with a computer program stored thereon, the computer program being used for carrying out the method according to claim 3.

* * * * *